United States Patent [19]
Peil

[11] 3,831,078
[45] Aug. 20, 1974

[54] TRANSISTOR SWITCHING NETWORK WITH REDUCED DISSIPATION

[75] Inventor: William Peil, North Syracuse, N.Y.

[73] Assignee: General Electric Company, Syracuse, N.Y.

[22] Filed: Jan. 8, 1973

[21] Appl. No.: 322,092

[52] U.S. Cl............ 321/2, 321/15, 323/22 T, 323/DIG. 1
[51] Int. Cl............................. H02m 3/32
[58] Field of Search.......... 321/2, 15, 18; 323/17, 323/22 T, DIG. 1

[56] References Cited
UNITED STATES PATENTS

| | | | |
|---|---|---|---|
| 3,229,194 | 1/1966 | Mills | 323/DIG. 1 |
| 3,365,650 | 1/1968 | Camp et al. | 321/18 |
| 3,383,584 | 5/1968 | Atherton | 323/DIG. 1 |
| 3,584,289 | 6/1971 | Bishop et al. | 321/2 X |
| 3,735,235 | 5/1973 | Hamilton et al. | 321/2 |

*Primary Examiner*—A. D. Pellinen
*Attorney, Agent, or Firm*—Richard V. Lang; Carl W. Baker; Frank L. Neuhauser

[57] ABSTRACT

The transistor switching network comprises a power transistor, used to deliver power from a DC source to a load, which is switched at a rate at which stored charge in the transistor potentially increases the internal power dissipation. A current transformer is provided comprising a small saturable core whose primary carries collector current and whose secondary couples the induced voltage to the base. The core of the current transformer creates an initial and a terminal transient which steepens the switching characteristic and reduces the power dissipation in the transients. The invention has applicaton to regulators and to DC to DC converters.

10 Claims, 11 Drawing Figures

TRANSISTOR SWITCHING NETWORK WITH REDUCED DISSIPATION

BACKGROUND OF THE INVENTION:

1. Field of the invention:

The present invention relates to power supplies wherein a transistor is switched to control the flow of current to a load. Such devices include DC to DC converters wherein the switching involves pairs of transistors operating alternately, as well as regulators, wherein the switching is of a single transistor.

2. Description of the Prior Art

It is well known that a vacuum tube or a transistor when operating in a switching mode, typically to convert DC to AC or DC to DC, is most efficient when it can be switched rapidly from a state of full conduction to nonconduction. Several means to bring this to pass are known. DC to DC converters normally combine transistors with transformers having windings whose function is to force the conduction of one transistor while the other is becoming nonconductive, and vice versa, to hasten the device into a stage of full conduction or nonconduction. Steep switching rates may also be obtained by the use of saturable transformer configurations. In general, the need for good switching response has led to the practice of using switching devices and power transformers, optimized for one of several common modes of operation. Both the transformers and the switching devices are costly at conventional power frequencies.

Switching converters that switch efficiently have a radiation problem when used to power equipment operating with low level signals. Their switching transients widely radiate high frequency energy when large currents are involved. This requires careful isolation of the power supplies from the signal equipment, and carfeul filtering of the lines carrying power to the signal equipment. Should the signals be video signals in a conventional television format, the adverse effect of the switching transients in the power supply can be avoided by timing them to be off picture. Conventional switching regulators often are self-running and are not readily synchronized. Synchronization of the power supply firing instants has required substantial circuit redesign and considerable increase in complexity. In addition, if one uses the vertical flyback interval, operating at the vertical 30–60 hertz frequency, the required filter components become massive. On the other hand, if one switches at the horizontal rate (15 KHz), or a subharmonic of it, then one may use low cost, light weight ferrite core transformers. The cost advantage gained in the transformer elements in raising the switching frequency is partially offset by the increase in difficulty in achieving efficient switching at the higher frequency with comparably low cost transistors. There is also added difficulty in achieving synchronization of the switching without a loss in efficiency. The difficulty in low cost power transistors is that stored charge delays the "turn-off" and increases the heat dissipation. A second problem of synchronizing at the higher frequency is the need to generate and transfer an accurate timing waveform to the low impedance transistor base circuit with a sufficiently short rise time to effect an efficient turn-on. If the transistor turns on too slowly, there is a heat dissipation problem there also.

SUMMARY OF THE INVENTION:

Accordingly, it is an object of the present invention to provide an improved transistor switching network.

It is another object of the invention to provide means for reducing heat dissipation arising from stored charge when a transistor is being switched at a high frequency rate.

It is a further object of the invention to provide means for improving the efficiency of a transistor switch, when the input drive waveform has a distinct rise time.

It is another object of the present invention to provide a regulated voltage doubler having improved transistor switching.

It is an object of the present invention invention to provide an improved DC to DC converter using low cost transistors and low cost magnetic materials that can be readily synchronized and is of high switching efficiency.

These and other objects of the invention are achieved in accordance with the invention in a transistor switching network comprising a source of D.C. potentials, a load, a source of periodic timing waveforms having a limited rise time and of specified radio frequency, a switched power transistor exhibiting appreciable stored charge at said frequency connected to conduct current from the DC source to the load, and having means to reduce transistor dissipation during switching comprising a current transformer regeneratively coupling collector current to said base to steepen the turn-on and turn-off portions of the conduction cycle. The current transformer comprises conductors carrying collector current and base current which are inductively linked by a small saturable core of restricted volt time area to restrict the period of regeneration to the switching intervals. The core is also selected to hold the maximum inverse switching transients below the base-emitter breakdown of the transistor by appropriate material bandwidth limiting. The magnetic material is normally a low frequency ferrite. The transistor switching network may be used in a single transistor configuration for regulating a voltage doubler. The invention may also be used in a DC to DC converter employing a pair of transistors. There two current tranformers are used to cross couple the collector current in one transistor to the base of the other transistor. The latter configuration may also be supplemented with regenerating windings of less feedback than that required for self-running. Additional means such as a reverse diode in shunt with the current limiting base resistance may be provided to reduce the impedance for sweeping out a stored charge. In both configurations, the current transformer provides an improvement in both the initial rise time of the conduction waveform and an improvement in the fall time. Heat dissipation losses are normally reduced by as much as one half.

BRIEF DESCRIPTION OF THE DRAWING:

The novel and distinctive features of the invention are set forth in the claims appended to the present application. The invention itself, however, together with the further objects and advantages thereof may be best understood by reference to the following description and accompanying drawings in which:

Figure 1:
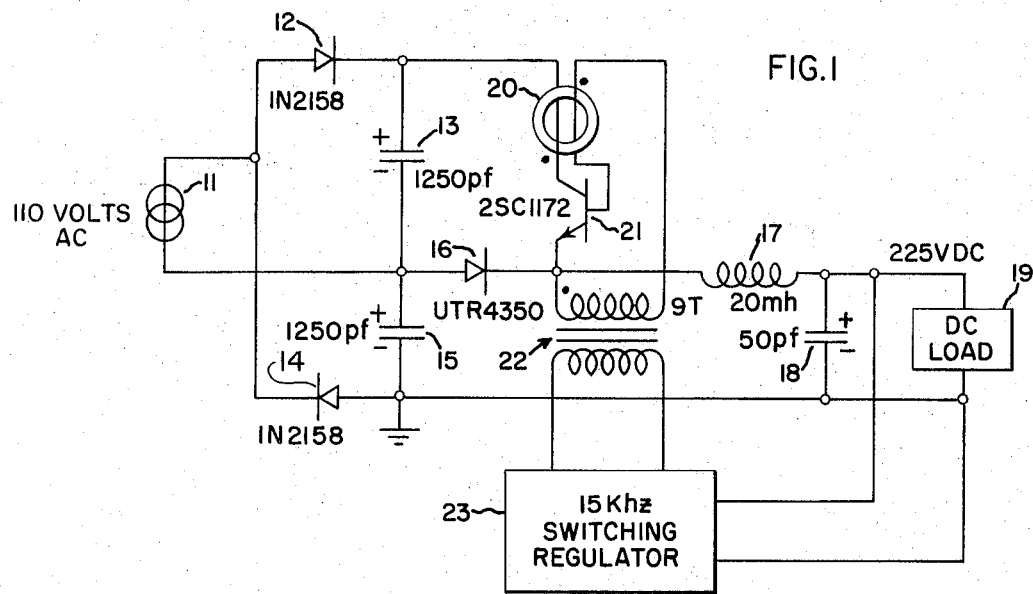
FIG. 1 is an illustration of a regulated voltage doubler employing the novel transistor switching network.

DESCRIPTION OF THE PREFERRED EMBODIMENT:

Referring now to FIG. 1 there is shown a first embodiment of the invention in application to a regulated voltage doubler. The doubler converts an input alternating voltage derived from the AC source 11, typically 110 volts, to a 225 volt regulated DC and applies it to load 19. The doubler comprises a first diode 12 having its anode coupled to one terminal of the AC source 11 and its cathode connected to the positive terminal of a large storage capacitor 13. The same AC source terminal is coupled to the cathode of a second diode 14, of which the anode is connected to the negative terminal of a second equally large storage capacitor 15. The negative terminal of the storage capacitor 15 is connected to an internal ground. The positive terminal of the capacitor 15 is connected to the negative terminal of the capacitor 13 and both capacitor terminals are connected to the other AC source terminal. A connection is also made to the anode of a diode 16, of which the cathode is coupled to a ripple filter comprising a series inductance 17 and a shunt capacitor 18. The capacitor 17 is shunted by the DC load 19 and the two are returned to the internal ground.

The regulator makes intermittent application of the doubler voltage to the load through a switched power transistor 21. The positive terminal of the capacitor 13 is led through a ferrite toroid 20 to the collector of power transistor 21. The emitter of power transistor 21 is connected to the cathode of diode 16 and the input to the ripple filter 17, 18. The base lead of transistor 21 is also led through the core 19 in a sense opposite to the collector load and then to one end of the secondary of a switching transformer 22. The other end of the secondary of 22 is returned to the emitter of transistor 21. "Steep" waveforms which are designed to turn-on and turn-off the transistor 21 are applied through the transformer 22 from a 15 KHz switching regulator 23, responsive to changes in potential at the load 19.

Assuming the AC source 11 is on and a small current is being drawn by the load 19, a positive potential in excess of the AC RMS voltage will appear across each capacitor (13, 15) and double that voltage will appear across the two capacitors with respect to the internal ground. The diode 16 couples the voltage across capacitor 15 through the filter 17, 18 to the DC load 19. This connection sets an (unregulated) lower limit to the potential across the DC load.

The double potential as the positive terminal of capacitor 13 is intermittently connected to the load 10 through transistor 21. Conduction by the transistor 21 is controlled by the switching potential supplied from the switching regulator 23 and coupled between base and emitter. Thus, during moments of conduction, the double voltage at the positive terminal of capacitor 13 is passed through the collector and emitter of transistor 21, the filter 17, 18 and applied to the load 19. The diode 16 provides a return path for the current in inductor 17 when transistor 21 is nonconducting. Tnus, when the regulator calls for increased voltage, the transistor 21 becomes conductive, and the double voltage available at the capacitor 13 becomes available. The normal output voltage is intermediate the two capacitor voltages. The switching rate of the regulator, since it is desired to produce a steady DC output with low ripple, is set at a low (15 kc) radio frequency.

The regulator is normally designed to produce steepened wavefronts, and the mode of regulation is by pulse width adjustment. A frequency of 15 kilohertz has been selected since it is a frequency at which low cost ferrite transformers are efficient and a frequency which is desirable when switching transients are a problem with associated video equipment. Partly as a result of limitations in the wave generation, and partly as a result of limitations in the ferrite transformer, the drive at the transistor input may be less steep than the ideal rectangular waveform. Thus, the switching transistor even if ideal, would tend to switch rather slowly from conduction to nonconduction and from nonconduction to conduction, during which substantial quantities of power would be dissipated in the transistor. However, the transistor is not ideal. If the transistor is a conventional high power, low cost device, it will exhibit appreciable stored charge. This stored charge interferes with a sharp turn-off and further increases the power dissipation.

The foregoing circuit switches quite efficiently as a result of the current transformer 20 which sharpens both initial and terminal transients. The transformer 20 is formed of a ferrite core which regeneratively links the collector current carrying lead to the base current carrying lead. The current transformer is of low impedance, consisting typically of a single pass of wire through the core. The core is small, and of a restricted volt time area which is designed to saturate at the leading edge of the waveform. This produces a steeper rise in base current than in the input waveform at the transistor and a steeper fall than the transistor would normally provide.

Figure 2A:
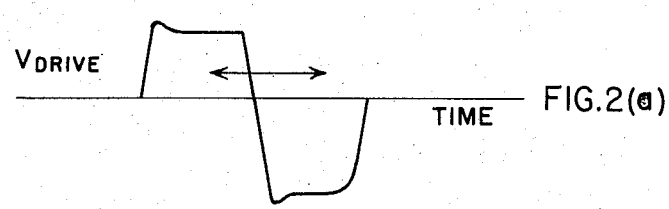
FIGS. 2a through 2e are graphs illustrating the wave shapes encountered in the embodiment of FIG. 1.
Figure 2B:
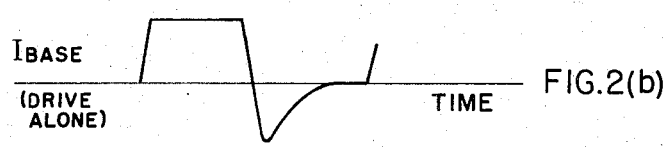
Figure 2C:
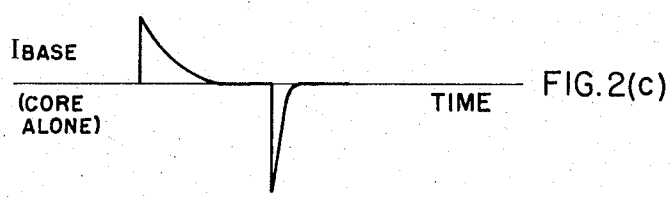

The voltage drive waveform at the transformer secondary is illustrated in FIG. 2a. It has a distinct rise time, overshoots slightly, and falls with a distinct "fall" time. The dwell time is adjustable for purposes of achieving regulation. The base current, assuming core 20 is not present, is illustrated in FIG. 2b. The curve reaches saturation with a distinct rise time, remains saturated, and falls with a distinct "fall" time, overshooting and decaying as stored charges leak out of the junction. FIG. 2c is a curve illustrating the effect of the core alone on base current, assuming the present input waveform.

Two base current transients occur due to the core. The initial transient rises steeply but falls before the conduction cycle is over. Being "loaded", the forward current transient is of a moderate height, and is normally adjusted by core material and dimensioning to be about the same height as the normal drive waveform. Both transient and drive should be large enough to achieve transistor saturation. The transient rise terminates, however, when core saturation occurs, a consequence of the limited volt time area of the small core selected. The decay commences very quickly, and is complete by the middle of the conduction pulse.

During the terminal transient, the core induced transient is oppositely directed and quickly sweeps out the stored charge in the transistor. Due to lack of loading, the inverse transient tends to exceed the voltage of the positive going transient. It is of course essential for preservation of the transistor that the reverse base emitter voltage not be exceeded. This is achieved by selection of a low frequency ferrite material, which cuts off high frequency components and limits (irrespective of the rise time of the applied pulse) the actual height of the inverse pulse that can be attained. In practice, this inverse pulse should be held to about 5 volts for typical high power transistors (2SC1172).

Figure 2D:
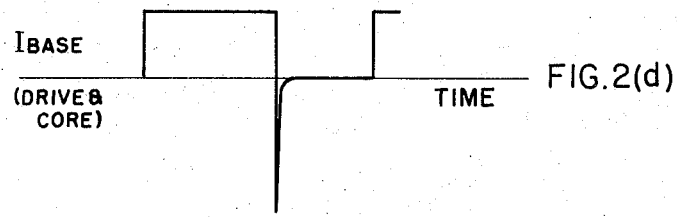
Figure 2E:

The resultant collector conduction waveform using the core 20 is nearly rectangular, and the power dissipation in the transistor is substantially reduced. The plot of base current as a result of drive waveform and the core is shown in FIG. 2d. The base current becomes more nearly rectangular at the initial edge, stays in saturation throughout the conduction cycle, and then sharply switches to a negative direction as stored charge is driven out of the transistor by the core induced transient. The collector current takes the form illustrated in the solid line in FIG. 2e. The curve is essentially rectangular, having a steep rise time and little or no curvature at the turn-off point. Both leading and trailing edge sharpening is due to the cores. Without the cores, the dotted outline in FIG. 2e is followed. The initial rise time is primarily a transformer characteristic. The terminal decay is the result of charge storage in the transistor. Use of the foregoing current transformer with a saturable core has reduced the power dissipation in the switching transistor about in half.

The invention is also applicable to a DC to DC converter. The DC to DC converter, illustrated in FIG. 3 comprisea a pair of switching transistors Q3, Q4 and an output transformer T3. Switching of Q3, Q4 (synchronized by the source 32) controls the flow of current from DC source 31 through the primary windings of the transformer T3. Transformer T3 has a low cost, nonsaturating ferrite core, the primary windings (N1, N2) noted, regenerative windings N3, N4 and a pair of secondary windings N5, N6. The converter output current appears in the secondary windings N5, N6, where it is rectified for the DC load 33.

The two primary windings N1 and N2 of transformer T3 have an equal number of turns and are serially connected with their common connection returned to the positive DC source 31. The dotted end of winding N1 (the dots denoting the winding polarity) is coupled to the collector of the transistor Q4, while the undotted end of the winding N2 is coupled to the collector of transistor Q3 for conduction of the primary current. The wire carrying the Q4 collector current passes through a small core 36 also encircling the base lead of Q3, while the wire carrying the Q3 collector current passes through a similar small core 37, encircling the base lead of Q4. As in the first embodiment, these cores form a current transformer. Here they provide cross coupling from one transistor to the other.

The regenerative transformer windings N3 and N4 assist in the switching of Q3, Q4 but do not produce a self-running condition. The undotted terminal of winding N3 and the dotted terminal of N4 are connected to an internal ground 35 for the DC-DC converter to which the emitters of Q3, Q4 are also returned. The other end of regenerative winding N3 is coupled through serial resistance R10 to the base of Q3, the connection to the base passing through the ferrite bead 38. The other end of N4 is similarly connected through resistance R11 to the base of Q4, the connection to the base passing through the ferrite bead 39. The beads 38, 39 are positioned close to the switching transistors. The beads 38, 39 are smaller than the cores 36, 37 and are designed to provide a high frequency "roll-off" to currents at the bases to avoid high frequency instability.

External sinusoidal drive for convertor switching is obtained from the control transformer (T2). The secondary windings N2, N3 of T2 are coupled between the bases and emitters of power transistors Q3, Q4. The undotted terminal of secondary windings N2 (of T2) and the dotted terminal of secondary winding N3 (of T2) are coupled to floating ground 35. The dotted terminal of secondary winding N2 (of T2) is coupled through 2 ohm resistance R8 to the base of transistor Q3. Resistance R8 is shunted by reversely poled diode CR2. Similarly the undotted terminal of secondary winding N3 is coupled through resistance R9 to the base of transistor Q4, with resistance R9 similarly shunted by reversely poled diode CR3. The lead from the resistance R8 first passes through the small core 36 through which the collector lead from Q4 also passes, and then through the bead 38 to the base of Q3. Similarly, the lead from the resistance R9 first passes through the small core 37, through which the collector lead from Q3 also passes, and then through the bead 39 at the base of Q4.

The control transformer secondary windings thus couple a drive voltage into the base circuits of Q3 and Q4 which forces the power transistors Q3 and Q4 to conduct alternately in synchronism with the applied control voltage from source 32. The switching action, however, is modified by the presence of the reversely poled shunted diodes CR2, CR3, the small current transformer cores 36, 37, the beads 38, 39, and the regenerating windings N3 and N4 of (T3). Their collective effect is to permit the DC to DC converter to switch efficiently at the relatively high frequency of 15 KHz, while using conventional low cost power transistors and low cost linear ferrite transformer cores.

The voltage magnitude and impedance of the sine wave drive is controlled so as to cause the conducting transistor to turn off before the off transistor turns on. The actual turn-on of the transistor is accomplished through the cross coupling of the "speed-up" cores. When the on transistor starts to turn off, the decrease in collector current is coupled to the opposite base and provides the drive for turn-on. The onset of turn-on is also sensed, cross coupled back and causes the completion of turn-off to be very rapid. This mode of operation completely avoids the possibility of both transistors conducting at the same time, a major cause of lost efficiency.

Furthermore, the "speed up" cores are useful in rectifying the transformed output. The heavy regeneration during switching not only greatly mitigates the stored charge problem in the transistors but also helps to provide fast switching in the rectified DC output by quickly sweeping out the stored charge in the rectifying diodes. This prevents the transistors from "hanging-up" for prolonged periods in a high dissipation state waiting for the stored charge in the diodes to be swept out.

Figure 4A:
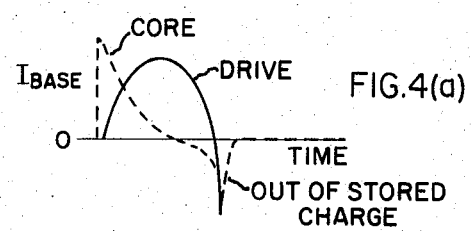
FIGS. 4a through 4d represent waveforms illustrative of the operation of the embodiment of FIG. 3.
Figure 4B:
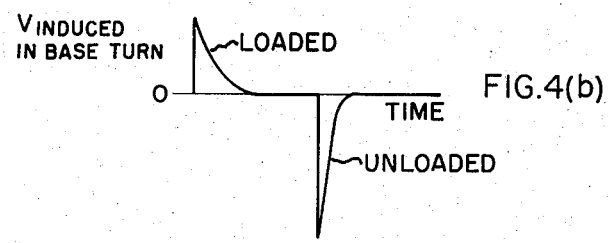
Figure 4C:
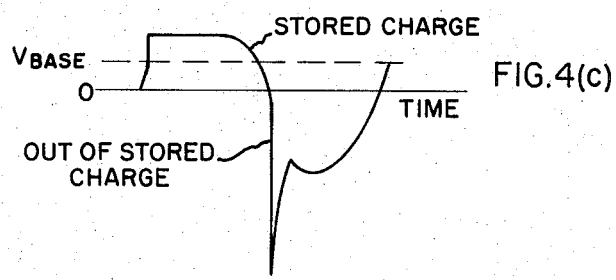
Figure 4D:

The wave shapes illustrating the operation of the cores, but not specifically the effects of the other elements, are shown in FIGS. 4a through 4d. FIG. 4a illustrates the base current in one transistor with the sinusoidal drive waveform shown in a solid line, while the base current due to the core is shown in dotted outline in the same figure. The switching transients (V base) attributable to the core is shown in FIG. 4b. As before, the initial transient is lower due to loading, while the terminal (inverse) transient, is lightly loaded and steeper. (The inverse transient must not be large enough to carry the transistor to base emitter breakdown). FIG. 4c illustrates in one transistor only, the voltage at the base. The solid horizontal line represents 0 base volts, while the dotted horizontal line represents the Veb drop, before conduction can occur. The vertical transient above Veb is steep, and remains horizontal until the sinusoidal drive peaks and begins to decay. The base voltage then falls sharply, when the inverse transient occurs, drawing out the stored charge. The base voltage then follows the input waveform, until it is driven into conduction in the rest cycle. The collector current illustrated in FIG. 4d is very nearly perpendicular at the initial and terminal transients. The effect of the finite rise time of the drive and the stored charges in delaying the fall time are shown in dotted outline in FIG. 4b. The tops of the conduction cycle are essentially flat, the stored charges holding up the conduction until the terminal core transient.

While not specifically noted in the figures, the effect of regenerating windings N3 and N4 can be substantial (20 percent) in augmenting the base drive and holding the high level of collector current.

The composite conduction characteristic formed from the two transistors is thus a relatively accurate ideal waveform. In practice, the principal advantage of the arrangement is to make it possible to make an efficient converter using both cheap non-saturating ferrite cores, and low cost power transistors subject to the stored charge problem. The improvement in efficiency has been in a decrease in about half in the temperature elevation of the switching transistors. Calculation indicates that in a 600 watt supply, operating at about 450 watts, the dissipation is reduced from 25 watts to 7-½ and with a saving of 17-½ watts. The ability to operate with efficiency with a sinusoidal drive permits the present supply to be synchronized with the video waveform of a television format, so as to place the switching transients in the flyback region. This dictates that the switching rate be ½ the line rate of the video signal. Placing the switching transients "off picture" makes it possible to use the present power supply as a source of power for a xenon arc lamp without elaborate shielding.

Figure 3:
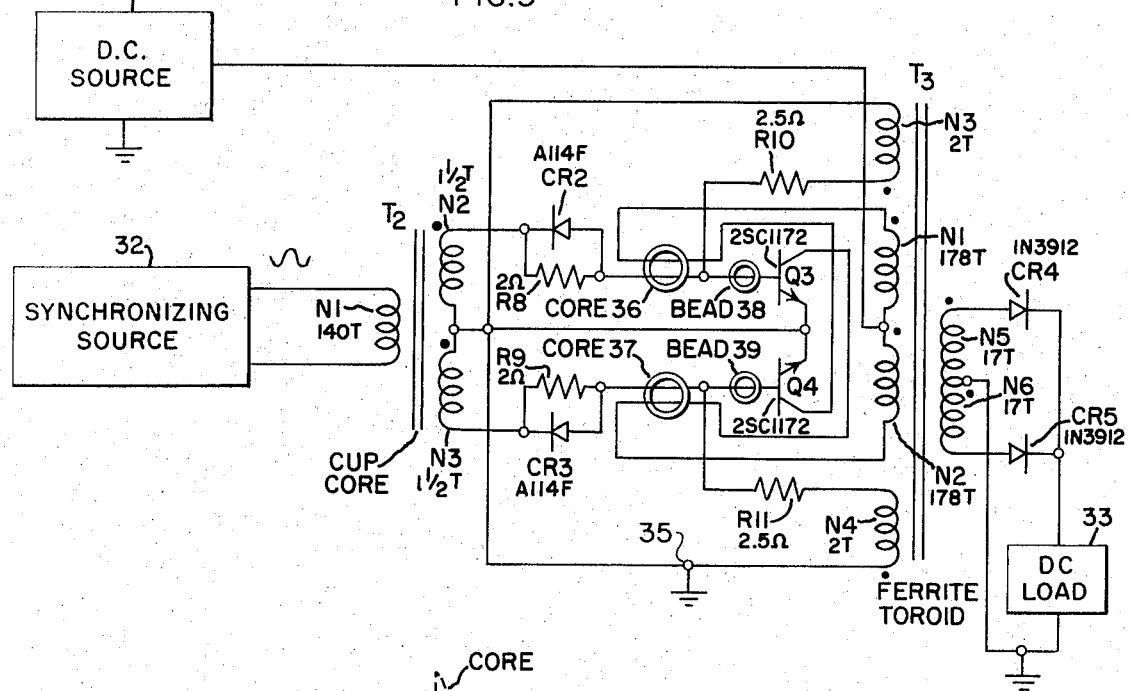
FIG. 3 is an illustration of a synchronized DC to DC converter embodying the invention.

The practical embodiments illustrated in FIGS. 1 and 3 employ commercially available components having values generally illustrated in the figures. The "cores" 20, 36, 37 are ½ inch in diameter, having an inner diameter of 0.281 and a thickness of 0.188 inches. The material is of high permeability (5,000 $\mu_0$) material whose $\mu$ begins to fall at $10^5$ hertz. The cores 38, 39 are Ferrox cube beads with an outside diameter of about ⅛ inches and a thickness of about ⅛ inch, of medium permeability and designed for shielding and for RF decoupling.

The DC to DC converter illustrated in FIG. 3 uses an input transformer which is a cup core ferrite, while the output transformer uses a ferrite toroid. The input waveform can be sinusoidal and is derived from a tank circuit of which the input transformer forms a part. The drive for the switching transistors lightly loads the tank circuit. The tank circuit is typically tuned to the precise resonant frequency, and maintained in synchronism by a feedback network tied to the horizontal "flyback" circuit of the video display equipment.

The current transformers illustrated may of course take other forms. The simplest has been its use of straight leads linked by a common core. This provides a current coupling of about 50 percent which is quite adequate. The term "current transformer" has been used to denote that its primary (or collector) winding represents a negligible impedance in respect to the balance of the collector load. Since the base circuit is also a straight conductor, the direct intercoupling between wires is small in relation to that provided by the cores. In any event, one might increase the windings of the base path, to enhance the drive, but the additional coupling has not been found necessary.

What I claim as new and desire to secure by Letters Patent of the United States is:

1. A transistor switching network comprising:
   a. a source of DC potentials,
   b. a load,
   c. a source of periodic timing waveforms having a limited rise time and of specified frequency,
   d. a power transistor having base, emitter and collector electrodes, connected to conduct current from said DC source to said load, said periodic waveform being coupled between said base and emitter electrodes to periodically start and stop said conduction, said transistor exhibiting appreciable stored charge at said frequency, and
   e. means to reduce dissipation in said transistor during switching comprising a current transformer regeneratively coupling said collector current to said base to steepen the turn-on and turn-off portions of said conduction cycle, said current transformer comprising collector current and base current carrying conductors inductively linked by a small saturable core of restricted volt time area to restrict said period of regeneration to the switching intervals and of a magnetic material having a sufficiently low, high frequency cut-off to hold the maximum inverse switching transients below the base emitter breakdown of said transistor.

2. A transistor switching network as set forth in claim 1 wherein said saturable core is a closed loop of ferrite.

3. A transistor switching network as set forth in claim 1 wherein
   a. said source of DC potentials is a pair of series connected capacitors recurrently charged from the AC source through a pair of diodes in a voltage doubling configuration; wherein
   b. said load is coupled through a diode to the junction of said capacitors and to the other terminal of one capacitor; and wherein
   c. the collector of said transistor is coupled to the free terminal of said other capacitor and the emitter of said transistor is coupled to the connection of said load and diode for providing intermittent current conduction from said DC source to said load, the potential across said load being a function of the percentage of transistor conduction time.

4. A transistor switching network comprising:
   a. a source of DC potentials,
   b. a load,
   c. a source of periodic timing waveforms, having a limited rise time and of specified frequency, d. a pair of power transistors each having base, emitter and collector electrodes connected to conduct current from said DC source to said load, said periodic waveform being coupled between said base and emitter electrodes to cause alternate conduction of said power transistors, said transistors exhibiting appreciable stored charge at said frequency, and e. means to reduce dissipation in said transistors during switching comprising a first current transformer regeneratively coupling the collector current of one transistor to the base of the other transistor, and a second current transformer regeneratively coupling the collector current of said other transistor to the base of said one transistor to steepen the turn-on and turn-off portions of said conductive cycle; said current transformers each comprising collector current and base current carrying conductors inductively linked by a small saturable core of restricted volt time area to restrict said period of regeneration to the switching intervals and of a magnetic material having a sufficiently low, high frequency cut-off to hold the maximum inverse switching transients below the base emitter breakdown of said transistors.

5. A transistor switching network as set forth in claim 4 wherein said saturable core is a closed loop of ferrite.

6. A transformer network as set forth in claim 4 wherein said transistors are coupled in push-pull to said load by an output transformer having a first and a second primary winding each respectively connecting a collector to said DC source.

7. A transistor switching network as set forth in claim 6 wherein said periodic timing waveforms are sinusoidal, and are transformer coupled in push-pull to the bases of said power transistors, said emitters being connected in common.

8. The combination set forth in claim 7 wherein said output transformer has a magnetic core and a pair of regenerative windings coupled to the bases of said transistors and adjusted to augment the steepness of the switching transients while avoiding self-running operation.

9. The combination set forth in claim 8 wherein two resistances are provided, each connected in series between the base of each transistor and the associated driving winding to restrict the forward base current in that transistor, said resistances each being shunted by a reversely poled diode to facilitate sweeping out positive charge.

10. A transformer switching network as set forth in claim 9 wherein a small core is provided encircling the base lead of each power transistor, of a material which as a high frequency roll-off to avoid high frequency instability.

* * * * *